(12) United States Patent
Burdeniuc et al.

(10) Patent No.: US 7,666,919 B2
(45) Date of Patent: *Feb. 23, 2010

(54) AROMATIC DIACID ESTER DIOLS AND SUBSTITUTED CARBAMATES THEREOF FOR MINIMIZING DETERIORATION OF POLYURETHANE FOAMS

(75) Inventors: Juan Jesus Burdeniuc, Colmar, PA (US); Stephan Herman Wendel, Oldenburg (DE); Renee J. Keller, Auburn, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 481 days.

This patent is subject to a terminal disclaimer.

(21) Appl. No.: 11/374,742

(22) Filed: Mar. 14, 2006

(65) Prior Publication Data

US 2007/0219283 A1    Sep. 20, 2007

(51) Int. Cl.
*C08J 9/30* (2006.01)

(52) U.S. Cl. .................. 521/173; 521/155; 521/159; 521/172; 528/53; 528/81; 528/83

(58) Field of Classification Search .......... 521/129, 521/128, 130, 170, 155, 166, 159, 172, 173; 428/318.4; 525/438
See application file for complete search history.

(56) References Cited

U.S. PATENT DOCUMENTS

| | | | |
|---|---|---|---|
| 4,007,140 A | 2/1977 | Ibbotson | |
| 4,338,408 A | 7/1982 | Zimmerman et al. | |
| 4,433,170 A | 2/1984 | Zimmerman et al. | |
| 4,469,823 A | 9/1984 | Yeakey et al. | |
| 4,544,679 A | 10/1985 | Tideswell et al. | |
| 5,508,314 A | 4/1996 | Listemann et al. | |
| 5,559,161 A | 9/1996 | Klotz et al. | |
| 5,633,293 A | 5/1997 | V.C. Carr et al. | |
| 5,859,079 A | 1/1999 | Mercando et al. | |
| 6,114,403 A | 9/2000 | Mercando et al. | |
| 6,201,033 B1 | 3/2001 | Mercando et al. | |
| 6,232,356 B1 | 5/2001 | Mercando et al. | |
| 6,818,675 B2 | 11/2004 | El Ghobary et al. | |
| 6,858,654 B1 | 2/2005 | Wendel et al. | |
| 2002/0013378 A1* | 1/2002 | Sawai et al. | 521/170 |
| 2002/0094432 A1 | 7/2002 | Herzog et al. | |
| 2004/0014830 A1 | 1/2004 | Wiese et al. | |
| 2004/0116545 A1 | 6/2004 | Jakobstroer et al. | |
| 2004/0259967 A1 | 12/2004 | Neill et al. | |
| 2005/0032925 A1* | 2/2005 | Kaplan | 521/155 |
| 2006/0142407 A1 | 6/2006 | Hollmann et al. | |

FOREIGN PATENT DOCUMENTS

| | | |
|---|---|---|
| EP | 0 716 107 A | 6/1996 |
| EP | 1 674 493 A | 6/2006 |
| WO | WO 2004/113410 A1 | 12/2004 |

OTHER PUBLICATIONS http://www.stepan.com/en/products/product_detail.asp?id=706. Stepan Product Homepage, Mar. 2004—no author.*

* cited by examiner

*Primary Examiner*—Randy Gulakowski
*Assistant Examiner*—Michael Leonard
(74) *Attorney, Agent, or Firm*—Michael Leach

(57) ABSTRACT

A composition for making a polyurethane foam includes a non-fugitive tertiary amine urethane catalyst and an aromatic diacid ester diol or substituted carbamate thereof. Foams prepared from the reaction of a polyol and an organic isocyanate in the presence of these ingredients show excellent resistance to deterioration of physical properties upon humid ageing.

10 Claims, No Drawings

AROMATIC DIACID ESTER DIOLS AND SUBSTITUTED CARBAMATES THEREOF FOR MINIMIZING DETERIORATION OF POLYURETHANE FOAMS

FIELD OF THE INVENTION

This invention relates to polyurethane foams. More particularly, it relates to additives for reducing the deterioration of polyurethane foams under humid ageing conditions.

BACKGROUND OF THE INVENTION

Polyurethane foams are widely known and used in automotive, housing and other industries. Such foams are produced by reaction of a polyisocyanate with a polyol in the presence of a catalyst, typically a tertiary amine. Unfortunately, tertiary amine catalysts are usually malodorous and offensive, and many have high volatility due to their low molecular weight. To overcome this problem, polyurethane manufacturers have sought to achieve near zero amine emissions by using "non-fugitive" tertiary amine catalysts, which remain in the foam during and after formation. The retention is typically due to either low volatility or to reaction with other components of the composition. The latter variety typically remain in the foam due to the presence of an isocyanate-reactive group such as a primary or secondary amine, a hydroxyl, or other reactive group that ties them to the foam. Whether due to low volatility or by reaction with the polyurethane, use of non-fugitive tertiary amine catalysts greatly reduces amine emissions from the polyurethane, but has the unfortunate effect of reducing the stability of the polyurethane under humid ageing conditions. For example, foams based on 4,4'-diphenylmethane diisocyanate (MDI) may barely meet typical specification requirements after humid ageing, and foams based on toluene diisocyanate (TDI) may completely fail to meet specifications. In general, foams made with any tertiary amine catalyst that remains in the foam tend to exhibit poor humid aged physical properties. Such deterioration may be so severe as to make the foams unsuitable for use, for instance in automotive applications. Therefore, it would be desirable to overcome performance deterioration in polyurethane foams made with non-fugitive tertiary amine catalysts.

SUMMARY OF THE INVENTION

In one aspect, the invention provides a composition consisting essentially of a non-fugitive tertiary amine urethane catalyst and an aromatic diacid ester diol or substituted carbamate thereof according to formula (I).

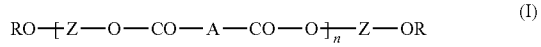

In formula (I), each R is independently H or substituted carbamoyl; each Z is independently selected from the group of divalent radicals consisting of $CH(CH_3)CH_2$, $(CH_2)_m$ wherein m is an integer from 2 to 6, polyethylene glycol moieties, polypropylene glycol moieties, and ethylene glycol-propylene glycol copolymer moieties; each A is a difunctional aromatic radical; and n is a number having a value from 1 to 100. The composition optionally also includes one or more blowing agents, crosslinkers, additional urethane catalysts, and surfactants, and optionally includes a polyol component consisting of one or more ester-free polyols. The ratio of equivalents of ester groups in the aromatic diacid ester diol or substituted carbamate thereof, to tertiary amine equivalents in the non-fugitive catalyst, is in a range of 0.1:1 to 50:1.

In another aspect, the invention provides a composition including a non-fugitive tertiary amine urethane catalyst, an aromatic diacid ester diol or substituted carbamate thereof according to formula (I) as defined above; and a polyol component consisting of one or more ester-free polyols, wherein a ratio of hydroxyl equivalents in the aromatic diacid ester diol or substituted carbamate thereof to hydroxyl equivalents in the polyol component is greater than zero but less than 1.5.

In yet another aspect, the invention provides a method of making a polyurethane foam. The method includes combining an ester-free polyol component, an organic isocyanate, a non-fugitive tertiary amine urethane catalyst, and an aromatic diacid ester diol or substituted carbamate thereof according to formula (I) as shown above. The ratio of equivalents of ester groups in the aromatic diacid ester diol or substituted carbamate thereof, to tertiary amine equivalents in the non-fugitive catalyst, is in a range of 0.1:1 to 50:1.

DETAILED DESCRIPTION OF THE INVENTION

The invention relates to novel compositions for making polyurethane foams. The compositions include at least one aromatic diacid ester diol or substituted carbamate thereof. The applicants have found that the inclusion of an aromatic diacid ester diol or substituted carbamate thereof serves to reduce or eliminate deterioration, under humid ageing conditions, of polyurethane foams made using non-fugitive tertiary amine urethane catalysts. The diols or carbamates, shown below as formula (I), may be used in conjunction with conventional non-fugitive tertiary amine catalyst compositions under otherwise conventional conditions to make polyurethane foams, i.e., making foams that contain tertiary amine functionality resulting from the use of such catalysts. The foams are made by combining at least one isocyanate compound, at least one non-ester polyol compound, and at least one non-fugitive tertiary amine catalyst composition in the presence of the aromatic diacid ester diol or substituted carbamate thereof. A blowing agent is usually included, but need not be.

As used herein, the term "aromatic diacid ester diol or substituted carbamate thereof" means a compound or mixture of compounds according to formula (I) below,

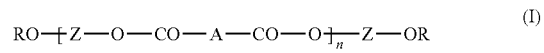

wherein each R is independently H or substituted carbamoyl; each Z is independently selected from the group of divalent radicals consisting of $CH(CH_3)CH_2$, $(CH_2)_m$ wherein m is an integer from 2 to 6, polyethylene glycol moieties, polypropylene glycol moieties, and ethylene glycol-propylene glycol copolymer moieties; each A is a difunctional aromatic radical; and n is a number having a value from 1 to 100.

When Z is $C_3H_6$, it is suitably derived from propylene oxide or propylene glycol. Other examples of suitable Z groups include those derived from ethylene glycol, diethylene glycol, triethylene glycol, propylene glycol, dipropylene glycol, and tripropylene glycol. Exemplary A groups include $C_{10}H_6$, such as may be derived from any isomer of naphthalenedicarboxylic acid, and $C_6H_4$, such as may be derived from phthalic acid or any of its positional isomers, i.e., 1,2-benzenedicarboxylic, 1,3-benzenedicarboxylic, and 1,4-benzenedicarboxylic moieties, and mixtures of these. However, other aromatic diacids may be used instead of these, or in addition. Also, as used herein, the term "aromatic diacid" will be understood to include those acids having at least two carboxyl groups on an aromatic nucleus, and thus the term also includes compounds comprising three or more carboxyl groups, such as for example any of the benzenetricarboxylic acid positional isomers. Similarly, the term "aromatic diacid ester diol" includes compounds having at least two hydroxyl groups. Therefore, for example, a compound according to the formula $C_6H_3(CO-OC_2H_4OH)_3$, derived from benzenetricarboxylic acid, is an "aromatic diacid ester diol" according to the invention. Compounds according to formula (I) where R=H may be made by standard methods of polyester synthesis known to those of ordinary skill in the polymer art.

Substituted carbamoyl groups suitable for use as R moieties in formula (I) include those resulting from reaction of any isocyanate used in the polyurethane art with the corresponding compound of formula (I) in which R is H. Examples of such compounds include polyurethane prepolymers such as are known in the art, as described later herein. It should be noted that, when the amount of a compound according to formula (I) in which R is substituted carbamoyl is calculated for use according to the invention, only the mass of the analogous diol from which it is derived (i.e. where R is H) is to be considered in the calculation. Accordingly, the number of hydroxyl equivalents in a carbamate of a compound of formula (I) is to be calculated as if the R group were H. That is, even though a hydroxyl group has been converted to a substituted carbamate in forming a prepolymer, and the hydroxyl therefore no longer exits, it is still to be counted as a hydroxyl group for purposes of calculations involving equivalents of hydroxyl groups.

The inventors have found that excellent resistance to polyurethane degradation may be obtained by incorporating compounds according to formula (I). Individual compounds wherein n has a single discrete value may be used, or mixtures may be used. Mixtures will commonly be used, for reasons of cost and availability, and in these cases n may represent an average value for the mixture. Exemplary compounds include those according to formula (I) wherein n has an average value ranging from 1 to 5, more typically from 1 to 3. Specific suitable compounds include the following compounds, and their positional isomers.

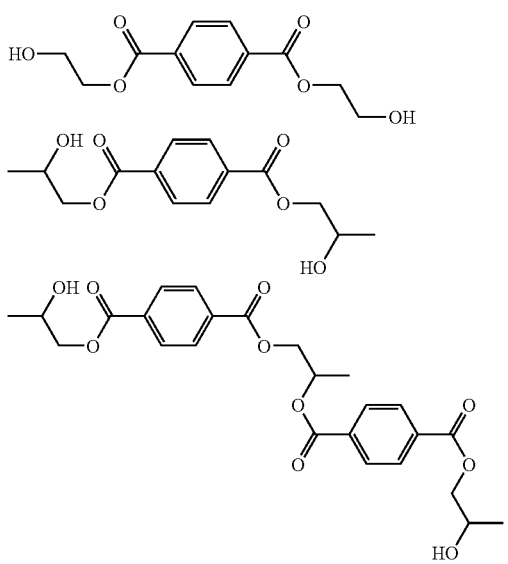

The amount of aromatic diacid ester diol or substituted carbamate thereof should be sufficient to provide a ratio of equivalents of ester groups to equivalents of tertiary amine in the tertiary amine catalyst in a range of 0.1:1 to 50:1. More typically, the ratio will be in a range of 0.1:1 to 10:1, and most typically 0.1:1 to 5:1. Usually, enough aromatic diacid ester diol or substituted carbamate thereof is included to provide at least one mole equivalent of ester.

For purposes of clarification, it must be noted that although some aromatic diacid ester diols are known as primary ingredients for some polyurethane formulations, where they are used in an amount suitable for forming a foam by reaction with an isocyanate compound, they are not used for that purpose according to the present invention. Rather, polyether and other ester-free polyols are used as the primary reactants for making the foams, and aromatic diacid ester diols (or substituted carbamates thereof) are used in certain specific and limited amounts in relation to the amount of non-fugitive tertiary amine urethane catalyst. The ratio of free hydroxyl equivalents in the aromatic diacid ester diol (or, in the case of a prepolymer, the free hydroxyl equivalents in the corresponding diol) to free hydroxyl equivalents in the polyol component is typically less than 1.5. More typically, the ratio is less than 1.0 and most typically less than 0.5. The aromatic diacid ester diol or substituted carbamate thereof will typically be present at less than 10 pphp, more typically less than 5 pphp. As noted below, the basis of pphp (parts per hundred polyol) for purposes of this invention is the ester-free polyol component.

Preparation of Foams

Foams of any of the various types known in the art may be made using the methods of this invention, using typical polyurethane formulations to which have been added one or more aromatic diacid ester diols (and/or substituted carbamates thereof) according to the invention. For example, flexible polyurethane foams with the excellent aging characteristics described herein will typically comprise the components shown below in Table 1, in the amounts indicated. The components shown in Table 1 will be discussed in detail later below.

TABLE 1

Polyurethane Components

| Component | Parts by Weight |
|---|---|
| Base Polyol | 20-100 |
| Polymer polyol | 0-80 |
| Silicone surfactant | 1-2.5 |
| Blowing agent | 2-4.5 |
| Crosslinker | 0.5-2 |
| Catalyst | 0.25-10 |
| Aromatic diacid ester diol or substituted carbamate thereof | 0.1-30 |
| Polyisocyanate | To provide NCO index = 70-115 |

The amount of polyisocyanate used in polyurethane formulations according to the invention is not limited, but it will typically be within those ranges known to those of skill in the art. An exemplary range is given in the above table, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula.

$$NCO\ index = [NCO/(OH+NH)]*100$$

Flexible foams typically use copolymer polyols as part of the overall polyol content in the foam composition, along with base polyols of about 4000-5000 weight average molecular weight and hydroxyl number of about 28-35. Base polyols and copolymer polyols will be described in detail later herein.

In some embodiments of the invention, the catalyst and the aromatic diacid ester diol or substituted carbamate thereof may be combined into a package, optionally with one or more ester-free polyols, including for example polyether polyols, and optionally with one or more blowing agents and/or other additives commonly used in polyurethane formation. Examples of these other optional components are listed below, and they do not affect the basic nature of the invention. Such mixtures may subsequently be combined with an organic isocyanate to form a polyurethane foam, again optionally in the presence of other additives known in the art.

In some cases, it is desired that mixtures containing aromatic diacid ester diols or substituted carbamates thereof with other ingredients not contain other components of a type and amount sufficient to materially affect the normal operation of the catalyst in the polyurethane-forming reaction, or to materially affect the activity of the aromatic diacid ester diol or substituted carbamate thereof in the formed polyurethane foam. Thus, in some embodiments it is undesirable for the aromatic diacid ester diol or substituted carbamate thereof to react to any substantial degree with other materials with which it may be mixed prior to formation of the foam. Alkaline materials, including for example alkali metal, alkaline earth metal, or quaternary ammonium hydroxides, are examples of components that may be undesirable in some embodiments of the invention, because they may react with the aromatic diacid ester diol or substituted carbamate thereof before and/or after formation of the foam. More generally, any reaction between the aromatic diacid ester diol or substituted carbamate thereof and any other component prior to formation of the foam may be undesirable in some, although not necessarily all, embodiments. Usually, it is desired that essentially all of the aromatic diacid ester diol or substituted carbamate thereof be intact and unreacted as of the time that foam preparation is to begin. In most cases, at least the majority and preferably at least 90% of the compound should be unreacted (not neutralized or otherwise converted to another compound) at that time. Stated in other terms, the mole ratio of unreacted aromatic diacid ester diol or substituted carbamate thereof to any of its reaction products should be at least 1:1 and preferably at least 9:1 at the time that the organic isocyanate is added to make the foam.

In addition to making flexible foams, the invention may also be used to prepare semi-flexible foams, such as are commonly utilized for many applications in the automotive industry (e.g., instrument panels and interior trims). The two main polyol components for semi-flexible foams are the base polyol and copolymer polyol, with the base polyol typically constituting from 70-100 wt % of the total polyol charge. The molecular weight of base polyols for making semi-flexible foams ranges from about 4500 to about 6000 for triols and from about 2000 to about 4000 for diols. Typically, the base polyol will include one or more ethylene-oxide-capped polyether polyols. Primary hydroxyl groups generally constitute more than 75% of the total hydroxyl group content of such polyols, and the capping range is typically about 10-20 wt %; i.e., the ethylene oxide units constitute 10-20% of the total polyol weight. Copolymer polyols (to be discussed in detail below), if used, typically are used at a rate of 0-20 parts per 100 parts of base polyol.

The base polyol and copolymer polyol are typically blended with low molecular weight cross-linkers to build hardness and promote faster demolding, with the level of cross-linker varying according to the hardness requirement of the finished part. Cell openers are also typically utilized in semi-flexible foams to reduce the internal foam pressure during the cure cycle and thus reduce pressure-relief voids and "parting lines". Adhesion promoters may be added, depending upon the quality of the vinyl skin, to improve the adhesion between the polyurethane foam and the vinyl skin. Finally, sufficient water (a reactive blowing agent) is typically added to give a free rise density of from about 3 to about 6 pounds.

Although specific exemplary types of polyurethane foams are discussed above and elsewhere herein, it is to be understood that polyurethane foams of any type may be prepared according to the invention.

Catalysts

The catalyst in the compositions of the present invention comprises a non-fugitive tertiary amine. As used herein, the term "non-fugitive tertiary amine" refers to a tertiary amine that also comprises an isocyanate-reactive group such as a primary amine, secondary amine, hydroxyl group, amide or urea, or a tertiary amine that has a high boiling point (typically above 120° C.). In either case, the result is that some or all of the catalyst remains in the foam. As used herein, reference to a tertiary amine catalyst "remaining in the foam" includes catalyst that remains in any form, whether or not it has reacted with any of the other components in the foam or its starting materials.

Non-fugitive tertiary amine catalysts include both gelling and blowing catalysts. Exemplary gelling catalysts include N,N-bis(3-dimethylamino-propyl) N-isopropanolamine; N,N-dimethylaminoethyl-N'-methyl ethanolamine (DABCO® T, Air Products and Chemicals, Inc. of Allentown, Pa.); N,N,N'-trimethylaminopropyl ethanolamine (POLYCAT® 17, by Air Products and Chemicals, Inc.), N,N-dimethylethanolamine (DABCO® DMEA); N,N-dimethyl-N', N'-2-hydroxy(propyl)-1,3-propylenediamine; dimethylaminopropylamine (DMAPA); (N,N-dimethylaminoethoxy)ethanol, methyl-hydroxy-ethyl-piperazine, bis(N, N-dimethyl-3-aminopropyl)amine (POLYCAT® 15), N,N-dimethylaminopropyl urea (DABCO® NE1060, DABCO® NE1070), N,N'-bis(3-dimethylaminopropyl) urea (DABCO® NE1060, DABCO® NE1070), bis(dimethylamino)-2-propanol, N-(3-aminopropyl)imidazole, N-(2-hydroxypropyl)imidazole, and N-(2-hydroxyethyl) imidazole.

Exemplary non-fugitive blowing catalysts include 2-[N-(dimethylaminoethoxyethyl)-N-methylamino]ethanol (DABCO® NE200), dimethylaminoethoxyethanol, N,N,N'-trimethyl-N'-3-aminopropyl-bis(aminoethyl) ether and N,N, N'-trimethyl-N'-aminopropyl-bis(aminoethyl) ether.

The catalyst may also comprise, in addition to non-fugitive tertiary amines, ones that are highly volatile and not isocyanate-reactive. Suitable volatile gelling catalysts may include, for example, diazabicyclooctane (triethylenediamine), supplied commercially as DABCO 33-LV® catalyst. Suitable volatile blowing catalysts include, for example, bis-dimethylaminoethyl ether, commercially supplied as DABCO® BL-11 catalyst by Air Products and Chemicals, Inc.; as well as pentamethyldiethylenetriamine (POLYCAT® 15, Air Products and Chemicals, Inc.) and related compositions; higher permethylated polyamines; 2-[N-(dimethylaminoethoxyethyl)-N-methylamino]ethanol and related structures; alkoxylated polyamines; imidazole-boron compositions; or amino propyl-bis(amino-ethyl)ether compositions. The catalyst compositions may also include other components, for example transition metal catalysts such as organotin compounds, for example when the desired polyurethane foam is a flexible slab stock.

Typically, the loading of non-fugitive tertiary amine catalyst(s) for making a foam according to the invention will be in the range of 0.1 to 20 pphp, more typically 0.1 to 10 pphp, and most typically 0.1 to 5 pphp. However, any effective amount may be used. The term "pphp" means parts per hundred parts polyol (for purposes of this invention, the ester-free polyol component is the basis).

Organic Isocyanates

Suitable organic isocyanate compounds include, but are not limited to, hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are diisocyanate mixtures known commercially as "crude MDI." One example is marketed by Dow Chemical Company under the name PAPI, and contains about 60% of 4,4'-diphenylmethane diisocyanate along with other isomeric and analogous higher polyisocyanates.

Also suitable are "prepolymers" of these isocyanate compounds, comprising a partially pre-reacted mixture of a polyisocyanate and a polyether or polyester polyol to convert one or more hydroxyls on the polyester polyol to substituted carbamate groups. Suitable prepolymers derived from polyether and polyester polyols are well known in the art, and prepolymers made from polyester polyols may or may not be used in formulations of this invention. Polyester polyols used for making prepolymers may include aromatic diacid ester diols or substituted carbamates thereof according to formula (I). To the extent that prepolymers made from such polyols are used in a polyurethane formulation, the ester content provided by the substituted carbamate of the aromatic diacid ester diol component is to be taken into account when calculating the amount of aromatic diacid ester diol present in the formulation. It must be emphasized that, although carbamates may fall within some broad definitions of the term "ester", carbamate groups are not considered to be esters for the purposes of this invention.

Polyol Component

Polyurethanes are produced by the reaction of organic isocyanates with the hydroxyl groups in a polyol, typically a mixture of polyols. For purposes of this invention, the term "polyol component" includes only ester-free polyols, by which it is meant that no esters are present in other than trace amounts. Thus, for example, polyester polyols are not part of the "polyol component" according to the invention.

The polyol component of the reaction mixture includes at least a main, or "base" polyol. Base polyols suitable for use in the invention include, as nonlimiting examples, polyether polyols. Polyether polyols include poly(alkylene oxide) polymers such as poly(ethylene oxide) and poly(propylene oxide) polymers and copolymers with terminal hydroxyl groups derived from polyhydric compounds, including diols and triols. Examples of diols and triols for reaction with the ethylene oxide or propylene oxide include ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, and similar low molecular weight polyols. Other base polyol examples known in the art include polyhydroxy-terminated acetal resins, hydroxyl-terminated amines and hydroxyl-terminated polyamines. Examples of these and other suitable isocyanate-reactive materials may be found in U.S. Pat. No. 4,394,491. Suitable polyols also include those containing tertiary amine groups than can catalyze the gelling and the blowing reaction of polyurethanes, for example those described in WO 03/016373 A1, WO 01/58976 A1; WO2004/060956 A1; WO03/016372 A1; and WO03/055930 A1. Other useful polyols may include polyalkylene carbonate-based polyols and polyphosphate-based polyols.

In one aspect of the invention, a single high molecular weight polyether polyol may be used as the base polyol. Alternatively, a mixture of high molecular weight polyether polyols, for example, mixtures of di- and tri-functional materials and/or different molecular weight or different chemical composition materials may be used. Such di- and tri-functional materials include, but are not limited to polyethylene glycol, polypropylene glycol, glycerol-based polyether triols, trimethylolpropane-based polyether triols, and other similar compounds or mixtures, provided that they are ester-free. In some embodiments of the invention, at least 50 wt % of the ester-free polyol component consists of one or more polyether polyols.

In addition to the base polyols described above, or instead of them, materials commonly referred to as "copolymer polyols" may be included in a polyol component for use according to the invention. Copolymer polyols may be used in polyurethane foams to increase the resistance of the foam to deformation, for example to improve the load-bearing properties of the foam. Depending upon the load-bearing requirements for the polyurethane foam, copolymer polyols may comprise from 0 to about 80 percent by weight of the total polyol content. Examples of copolymer polyols include, but are not limited to, graft polyols and polyurea modified polyols, both of which are known in the art and are commercially available.

Graft polyols are prepared by copolymerizing vinyl monomers, typically styrene and acrylonitrile, in a starting polyol. The starting polyol is typically a glycerol-initiated triol, and is typically end-capped with ethylene oxide (approximately 80-85% primary hydroxyl groups). Some of the copolymer grafts to some of the starting polyol. The graft polyol also contains homopolymers of styrene and acrylonitrile and unaltered starting polyol. The styrene/acrylonitrile solids content of the graft polyol typically ranges from 5 wt % to 45 wt %, but any kind of graft polyol known in the art may be used.

Polyurea modified polyols are formed by the reaction of a diamine and a diisocyanate in the presence of a starting polyol, with the product containing a polyurea dispersion. A variant of polyurea modified polyols, also suitable for use, are polyisocyanate poly addition (PIPA) polyols, which are formed by the in situ reaction of an isocyanate and an alkanolamine in a polyol.

Blowing Agents

Polyurethane foam production may be aided by the inclusion of a blowing agent to produce voids in the polyurethane matrix during polymerization. Any blowing agent known in the art may be used. Suitable blowing agents include compounds with low boiling points which are vaporized during the exothermic polymerization reaction. Such blowing agents are generally inert and therefore do not decompose or react during the polymerization reaction. Examples of inert blowing agents include, but are not limited to, carbon dioxide, chlorofluorocarbons, hydrogenated fluorocarbons, hydrogenated chlorofluorocarbons, acetone, and low-boiling hydrocarbons such as cyclopentane, isopentane, n-pentane, and their mixtures. Other suitable blowing agents include compounds, for example water, that react with isocyanate compounds to produce a gas.

Other Optional Components

A variety of other ingredients may be included in the formulations for making foams according to the invention. Examples of optional components include, but are not limited to, cell stabilizers, crosslinking agents, chain extenders, pigments, fillers, flame retardants, auxiliary urethane gelling catalysts, auxiliary urethane blowing catalysts, transition metal catalysts, and combinations of any of these.

Cell stabilizers may include, for example, silicone surfactants or anionic surfactants. Examples of suitable silicone surfactants include, but are not limited to, polyalkylsiloxanes, polyoxyalkylene polyol-modified dimethylpolysiloxanes, alkylene glycol-modified dimethylpolysiloxanes, or any combination thereof. Suitable anionic surfactants include, but are not limited to, salts of fatty acids, salts of sulfuric acid esters, salts of phosphoric acid esters, salts of sulfonic acids, and combinations of any of these.

Suitable crosslinking agents include, but are not limited to, low-molecular weight compounds containing at least two moieties selected from hydroxyl groups, primary amino groups, secondary amino groups, and other active hydrogen-containing groups which are reactive with an isocyanate group. Crosslinking agents include, for example, polyhydric alcohols (especially trihydric alcohols, such as glycerol and trimethylolpropane), polyamines, and combinations thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, and combinations thereof. Typical diamine crosslinking agents comprise twelve carbon atoms or fewer, more commonly seven or fewer.

Examples of chain extenders include, but are not limited to, compounds having hydroxyl or amino functional group, such as glycols, amines, diols, and water. Specific non-limiting examples of chain extenders include ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methyl-ethanolamine, N-methylisopropanolamine, 4-aminocyclohexanol, 1,2-diaminoethane, 2,4-toluenediamine, or any mixture thereof.

Pigments may be used to color code the polyurethane foams during manufacture, for example to identify product grade or to conceal yellowing. Pigments may include any suitable organic or inorganic pigments known in the polyurethane art. For example, organic pigments or colorants include, but are not limited to, azo/diazo dyes, phthalocyanines, dioxazines, and carbon black. Examples of inorganic pigments include, but are not limited to, titanium dioxide, iron oxides, or chromium oxide.

Fillers may be used to increase the density and load bearing properties of polyurethane foams. Suitable fillers include, but are not limited to, barium sulfate or calcium carbonate.

Flame retardants may be used to reduce the flammability of polyurethane foams. For example, suitable flame retardants include, but are not limited to, chlorinated phosphate esters, chlorinated paraffins, or melamine powders.

Practice of this invention may allow polyurethane manufacturers to realize one or more advantages. These may include a) use of a relatively inexpensive and readily available raw material (TDI) for flex-molded foams while obtaining low or no amine emissions; b) ability to use processing conditions similar to those already in use; c) avoidance in many cases of significant formulation changes (other than addition of the aromatic diacid ester diol or substituted carbamate thereof) because the process can use conventional non-fugitive catalysts; d) use of raw materials well known by the industry; and e) excellent physical properties measured at ambient conditions before and after humid ageing.

EXAMPLES

Following is a glossary of materials used in the Examples.

| Abbreviation | Compound | Source |
| --- | --- | --- |
| DABCO 33-LV ® | diazabicyclooctane | Air Products and Chemicals, Inc. |
| DABCO ® BL-11 | bis-dimethylaminoethyl ether | Air Products and Chemicals, Inc. |
| DABCO ® NE200 | mixture of N,N,N'-trimethyl-N'-hydroxyethyl-bisaminoethyl ether and dimethylaminopropyl ureas | Air Products and Chemicals, Inc. |
| DABCO ® NE1070 | mixture of mono and bis-dimethylaminopropyl urea | Air Products and Chemicals, Inc. |

Comparative Examples 1 and 2

Prior Art Formulations Using Fugitive vs. Non-Fugitive Catalysts

Foam pads were prepared by adding a tertiary amine catalyst to about 302 g of a premix (prepared as in Table 2) in a 32 oz (951 mL) paper cup. The formulation was mixed for about 10 seconds at about 6,000 RPM using an overhead stirrer fitted with a 2-inch (5.1 cm) diameter stirring paddle.

TABLE 2

Premix Components

| Component | Parts by weight |
| --- | --- |
| SPECFLEX ® NC 630[1] | 50 |
| SPECFLEX ® NC 700[2] | 50 |
| Water | 3.0 |
| DABCO ® DC6070[3] | 0.60 |
| Catalyst 1 (Gelling) | Varied |
| Catalyst 2 (Blowing) | Varied |
| Diethanolamine (crosslinker) | 0.70 |
| Toluene diisocyanate | To provide NCO index = 100 |

[1]High functionality capped polyether polyol of high molecular weight, functionality, and primary hydroxyl content with a base polyol molecular weight of about 5500, available from Dow Chemical Company, Midland, MI
[2]Grafted polyether polyol containing copolymerized styrene and acrylonitrile, base polyol molecular weight about 4800, available from Dow Chemical Company, Midland, MI
[3]Silicone surfactant available from Air Products and Chemicals, Inc.

The toluene diisocyanate was then added, and the formulation was mixed well for about another 6 seconds at about 6,000 RPM using the same stirrer, after which it was poured into a pre-heated mold at 70° C. and demolded after 4 minutes. The foam pads were removed from the mold, hand crushed, weighed and machine crushed at 75% pad thickness. The crushed foams were stored under constant temperature and humidity conditions for 48 hours before being cut and tested. The physical properties of polyurethane foams were measured under ambient conditions and after humid ageing. Table 3 shows the results obtained for a fugitive catalyst (Comparative Example 1) and a non-fugitive catalyst (Comparative Example 2). Different catalyst loadings were used in these examples as needed to achieve the same foam rise rate profile, to compare the catalysts on an equivalent activity basis.

Examples 3 and 4

Foam pads were made using the same procedure and the same non-fugitive catalyst as in Comparative Example 2, but in these examples an aromatic diacid ester diol was added to the polyol premix. For Example 3, a standard and commercially available polyester polyol (PEP, sold under the trade name TERATE® 2540 by Invista of Wilmington, N.C.) was added, and in Example 4 the same PEP was added but at a higher loading level (2.0 PPHP). TERATE® 2540 polyol contains aromatic diacid ester diols according to formula (I), derived from terephthalic acid and diethylene glycol.

the humid aged physical properties. For example, humid aged tensile strength increased from 78 kPa to 99 kPa. A similar improvement was observed for humid aged elongation. Improvement in humid aged load loss and humid aged compression set was also observed.

As seen in Example 4, doubling the PEP loading resulted in further improvements in humid aged physical properties. For

TABLE 3

|  | Comparative Example 1 | Comparative Example 2 | Example 3 | Example 4 |
|---|---|---|---|---|
| Catalyst Components | 33-LV/ BL-11 | NE1070/ NE200 | NE1070/ NE200/ PEP | NE1070/ NE200/ PEP[1] |
| Catalyst loading (PPHP) | 0.30/0.10 | 0.19/0.68 | 0.19/0.68/1.0 | 0.19/0.68/2.0 |
| Tensile (kPa) | 175 | 175 | 169 | 180 |
| 50% Compression Set | 6.37 | 7.04 | 7.30 | 5.06 |
| Elongation (%) | 104 | 97 | 95 | 96 |
| Humid Aged Tensile (kPa) | 161 | 78 | 99 | 176 |
| Humid Aged Compression Set (%) | 8.12 | 10.88 | 8.31 | 8.86 |
| Humid Aged Elongation (%) | 122 | 58 | 88 | 127 |
| Humid Aged Load Loss (%) | −21.64 | −46.38 | −30.88 | −25.23 |

[1]PEP was used at a loading level of 2.0 PPHP.

As the above data show, physical properties measured at ambient conditions were similar for both prior art catalyst packages (Comparative Examples 1 and 2). The run using a more fugitive catalyst (33-LV/BL-11) produced a foam with reasonably good humid aged performance. However, the foam made with the non-fugitive catalyst (NE1070/NE200) without aromatic diacid ester diol suffered severe foam deterioration, as evidenced by the measured tensile, elongation, load loss and compression set values.

Addition of an aromatic diacid ester diol resulted in improvement. A comparison of Example 3 with Comparative Example 2 shows that addition of 1.0 PPHP of a polyester polyol to the polyether polyol premix in the non-fugitive catalyst based foam produced a noticeable improvement in example, humid aged tensile strength increased to 176 kPa, and humid aged elongation improved to 127%. A further improvement in humid aged load loss was measured as well, showing a loss of only 25.23%.

Comparative Examples 5-9

Other Esters Combined with Non-Fugitive Catalysts

Foam pads were prepared as described above, using various amounts of other esters instead of the aromatic diacid ester diols (and/or substituted carbamates thereof) of this invention. Foam pad test results are shown below in Table 4.

TABLE 4

|  | Comparative Example 5 | Comparative Example 6 | Comparative Example 7 | Comparative Example 8 | Comparative Example 9 |
|---|---|---|---|---|---|
| Catalyst Components | NE1070/ NE200/ DMP[1] | NE1070/ NE200/ DPP[2] | NE1070/ NE200/ DMT[3] | NE1070/ NE200/ GV[4] | NE1070/ NE200/ GV |
| Catalyst loading (PPHP) | 0.19/0.68/0.36 | 0.19/0.68/0.47 | 0.19/0.68/0.36 | 0.19/0.68/0.40 | 0.19/0.68/0.80 |
| Tensile (kPa) | 154 | 162 | 144 | 172 | 177 |
| 50% Compression Set | 10.9 | 11.0 | 11.5 | 5.9 | 5.2 |
| Elongation (%) | 91 | 95 | 87 | 112 | 111 |
| Humid Aged Tensile (kPa) | 44 | 34 | 47 | 43 | 48 |
| Humid Aged Compression Set (%) | 11.8 | 12 | 12.9 | 11.5 | 12 |
| Humid Aged Elongation (%) | 70 | 69 | 74 | 50 | 60 |
| Humid Aged Load Loss (%) | −40 | −40 | −45 | −50 | −50 |

[1]DMP = dimethyl phthalate
[2]DPP = dipropyl phthalate
[3]DMT = dimethyl terephthalate
[4]GV = γ-valerolactone A comparison of the runs shown in Table 4 with Comparative Example 2 (no aromatic diacid ester diol or substituted carbamate thereof) shows generally comparable or worse humid aged properties, and thus the esters used in Table 4 had little beneficial effect. This is in stark contrast to the improvement noted above when an aromatic diacid ester diol was used, and thus the presence of mere esters of any type was not enough to provide the benefits of this invention.

Although the invention is illustrated and described herein with reference to specific embodiments, it is not intended that the subjoined claims be limited to the details shown. Rather, it is expected that various modifications may be made in these details by those skilled in the art, which modifications may still be within the spirit and scope of the claimed subject matter and it is intended that these claims be construed accordingly.

What is claimed:

1. A method of making a flexible molded polyurethane foam, the method comprising combining in a mold a flexible polyurethane foam reaction mixture comprising (a) an ester-free polyol component consisting of 20-100 wt % polyether polyol and 0-80 wt % graft and/or polyurea modified co-polyols, (b) an organic polyisocyanate, (c) a non-fugitive tertiary amine urethane catalyst having an isocyanate reactive group, and (d) an aromatic diacid ester diol according to formula (I)

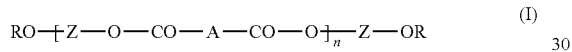
(I)

wherein each R is H; each Z is independently selected from the group of divalent radicals consisting of $CH(CH_3)CH_2$, $(CH_2)_m$ wherein m is an integer from 2 to 6, polyethylene glycol moieties, polypropylene glycol moieties, and ethylene glycol-propylene glycol copolymer moieties; each A is a difunctional aromatic radical; and n is a number having a value from 1 to 100; wherein the ratio of equivalents of ester groups in the aromatic diacid ester diol to tertiary amine equivalents in the non-fugitive catalyst is in a range of 0.1:1 to 5:1 and the ratio of hydroxyl equivalents in the aromatic diacid ester diol to hydroxyl equivalents in the polyol component is greater than 0 and less than 1.5.

2. The method of claim 1, wherein n is in a range from 1 to 5.

3. The method of claim 1, wherein Z is $C_2H_4$—O—$C_2H_4$.

4. The method of claim 1, wherein n is in a range from 1 to 5 and Z is $C_2H_4$—O—$C_2H_4$.

5. The method of claim 1 in which the flexible molded foam reaction mixture includes one or more blowing agents, crosslinkers, additional urethane catalysts, and surfactants.

6. The method of claim 1 wherein the ester-free polyol component comprises at least 50 wt % in total of one or more polyether polyols.

7. The method of claim 1 wherein Z is $CH(CH_3)CH_2$.

8. The method of claim 1 wherein A is $C_6H_4$.

9. The method of claim 2 wherein Z is $CH(CH_3)CH_2$.

10. The method of claim 2 wherein A is $C_6H_4$.

* * * * *